Nov. 10, 1959

W. L. McGRATH 2,911,838

VARIABLE SPEED DRIVE

Filed March 28, 1957

*INVENTOR.*
WILLIAM L. McGRATH.
BY
*Herman Seid*
ATTORNEY.

Nov. 10, 1959 W. L. McGRATH 2,911,838
VARIABLE SPEED DRIVE
Filed March 28, 1957 2 Sheets-Sheet 2
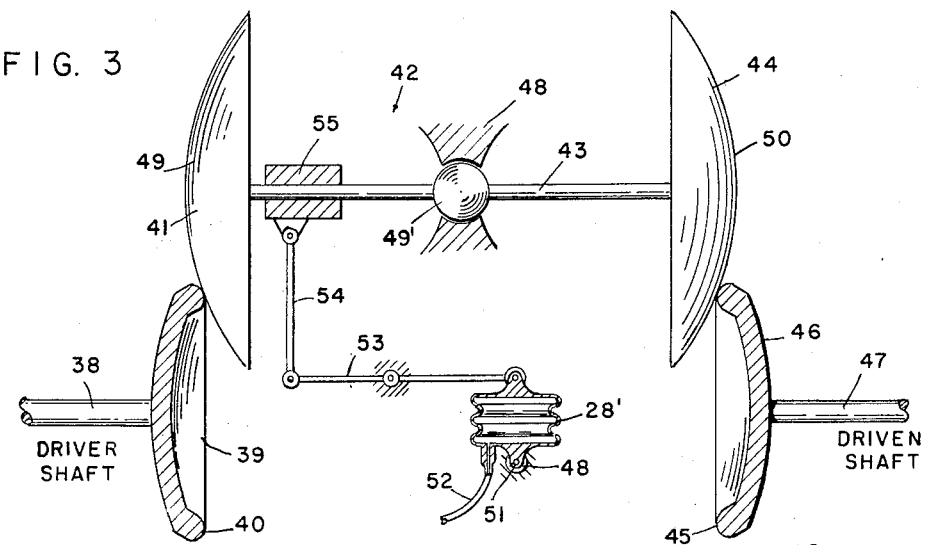
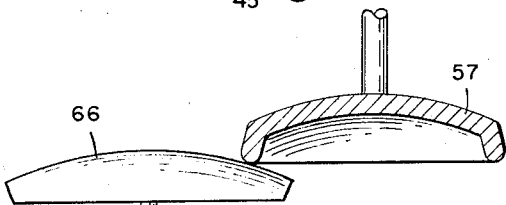
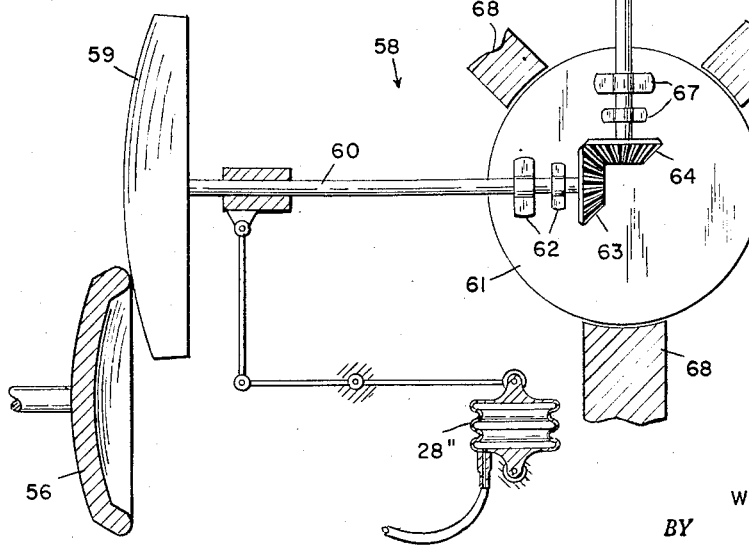
INVENTOR.
WILLIAM L. McGRATH.
BY Herman Seid
ATTORNEY.

United States Patent Office 2,911,838
Patented Nov. 10, 1959

2,911,838

VARIABLE SPEED DRIVE

William L. McGrath, Syracuse, N.Y., assignor to Carrier Corporation, Syracuse, N.Y., a corporation of Delaware Application March 28, 1957, Serial No. 649,076

8 Claims. (Cl. 74—190.5)

This invention relates to a variable speed transmission and more particularly to a drive which is capable of controlling the speed of a driven shaft in response to a control impulse.

In many applications it is necessary to change the speed of a driven shaft in response to a control impulse. By way of example and not of limitation, it is many times necessary to vary the drive of a refrigeration machine in response to either the suction or condenser pressure of the refrigeration system. Furthermore, in many other applications it is necessary and desirable to maintain a driven shaft at a constant speed irrespective of variations in the speed of the driver shaft. It is generally for such operation that the use of variable speed transmission of the present invention is contemplated.

It is the chief object of this invention to provide a simple, inexpensive, and efficient variable speed transmission which will change the speed of a driven member in response to a control impulse.

A still further object of this invention is to provide a simple, inexpensive and efficient variable speed transmission which will maintain the speed of a driven shaft constant irrespective of variations in the speed of rotation of a driver shaft. Other objects and attendant advantages of the present invention will readily be perceived hereafter.

The present invention relates to a variable speed transmission for varying the speed of a driven member relative to a driver member in response to a control impulse. A rotatable speed adjuster is pivotally mounted on a frame. A driver member drives said speed adjuster and the latter drives a driven member. Control means are provided for pivoting the speed adjuster in response to a control impulse so that the speed ratio between the driver member and the speed adjuster is varied, this in turn automatically varying the speed ratio between the speed adjuster and the driven member. The net result is that the speed of the driven member is varied with respect to the driver member. The present invention will be more readily understood when the following portions of the specification are read in conjunction with the accompanying drawings, wherein:

Figure 3 is a modification of the device of Figure 1;

Figure 4 is a further modification of the device of Figures 1 and 3; and

Figure 1:
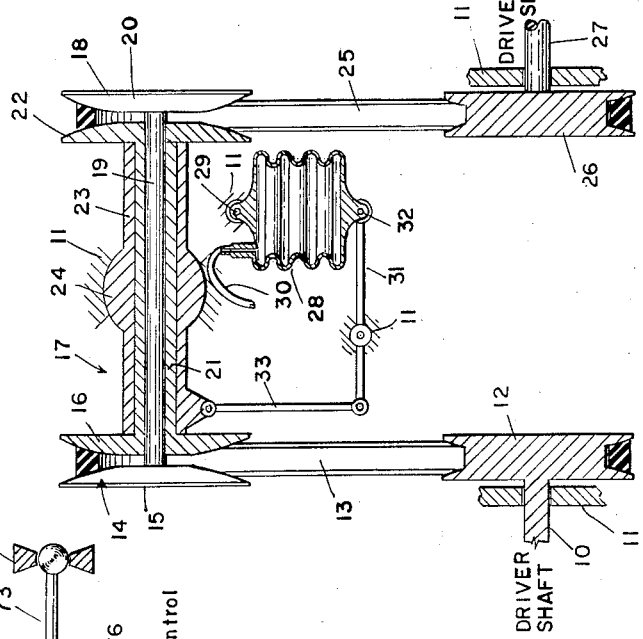
Figure 1 is a view, partly in section, of one modification of the present invention wherein the speed of a driven shaft may be changed in response to a control impulse.

In Figure 1, numeral 10 depicts a shaft which has one end suitably affixed to a source of rotary motion (not shown). At the other end, shaft 10, which is journalled in the wall of a frame or housing 11, is attached to a fixed pulley 12. A flexible driving member 13, such as a V-belt, extends between pulley 12 and expansible pulley 14 of speed adjuster assembly 17. Expansible pulley 14, which consists of pulley halves 15 and 16, is interconnected with expansible pulley 18 of speed adjuster assembly 17 in the following manner: Pulley half 15 is fixedly mounted on one end of rotatable shaft 19, to the other end of which is fixedly mounted pulley half 20 of expansible pulley 18. Shaft 19 is mounted for axial movement in rotatable shaft 21, to one end of which is affixed pulley half 16 of expansible pulley 14 and to the other end of which is affixed pulley half 22 of expansible pulley 18. It is to be noted that shaft 19 extends through appropriate apertures (not numbered) in pulley halves 16 and 22. Shafts 19 and 21, which are coaxial, are positioned in bearing member 23 which is pivotally mounted in housing 11 at its central portion 24 so as to permit the entire speed adjuster assembly 17 to pivot about its central portion 24. Suitable means (not shown) are provided for keying the speed adjuster 17 so that its pivotal movement is confined to the plane of the drawing. A flexible drive member 25, such as a V-belt, suitably links expansible pulley 18 to driven pulley 26 which is fixedly mounted on a shaft 27 which is in turn journalled in housing 11.

A motion producing device such as bellows 28 has one end pivotally mounted to frame 11 at 29. A tube 30 is connected to bellows 28 from a source of varying fluid pressure (not shown). A lever 31 is pivotally mounted to housing 11, and it has one end pivotally affixed to bellows 28 at point 32. The other end of lever 31 is pivotally affixed to link 33 which is in turn pivotally affixed to bearing 23.

The variable speed transmission of Figure 1 operates in the following manner: As there is a change in pressure at the fluid source to which tube 30 is connected, there will be a corresponding change in the condition of bellows 28, that is, it will either expand or contract. If bellows 28 expands bearing 23 will be moved in a clockwise direction about its pivot point 24. Since belt 13 is relatively unexpandable, the clockwise movement of bearing 23 will cause belt 13 to ride closer to the center of expandable pulley 14, that is, the effective radius of the latter is decreased. Furthermore, when pulley 14 moves away from pulley 12, pulley halves 15 and 16 will be caused to spread apart due to the action of belt 13 on their opposing faces. As pulley half 15 moves to the left in Figure 1, pulley half 20 of expansible pulley 18 will also move to the left because it is attached to shaft 19. Since expansible pulley 18, after clockwise motion of bearing shaft 23, is closer to pulley 26, and since pulley halves 20 and 22 are now closer together, belt 25 will be forced away from the center expansible pulley 18 thus causing the effective radius of the latter to be greater. It can thus be seen that the ratio, under the foregoing circumstances, between pulley 12 and pulley 14 is increased, and, that the ratio between pulley 18 and pulley 26 is also increased. The net effect of the foregoing is to cause driven shaft 27 to rotate at a higher speed, notwithstanding the constant speed of driver shaft 10. On the other hand if bellows 28 should be caused to contract, the opposite result is achieved in an analogous manner.

It is to be understood that while a pressure responsive control has been depicted in Figure 1 for the purpose of changing the speed of a driven shaft, any type of control which can produce motion can be substituted therefor. It is also understood that by varying the positions of the various pivot points and the length of the linkages any relatively small control impulse may be used to vary the speed of the driven member.

Figure 2:
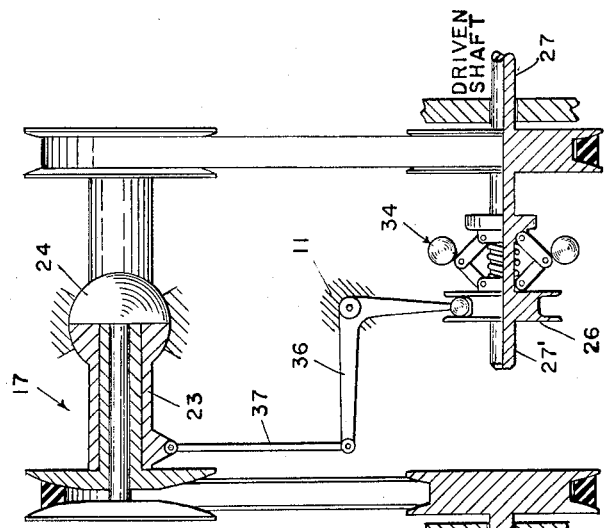
Figure 2 is a modification of the speed transmitting device of Figure 1 which can be used to maintain the speed of a driven shaft constant irrespective of variations in the speed of a driver shaft.

A modified form of the device of Figure 1 is depicted in Figure 2. The speed adjuster 17 of Figure 2 is of identical construction to the speed adjuster of Figure 1, as are the driver shaft 10 and all of the associated pulleys. However, the device of Figure 2 has the specific function of maintaining the driven shaft 27 at a constant speed irrespective of variations in the speed of driver shaft 10. As explained above, a clockwise movement of speed adjuster 17 about pivot 24 will cause driven shaft 27 to increase in speed, and a counter-clockwise movement will cause a decrease in speed of shaft 27. In order to maintain the speed of output shaft 27 constant, the foregoing characteristic of the speed adjuster 17 is utilized. To this end a conventional fly ball governor 34 is affixed to shaft extension 27' of shaft 27. In operation, if shaft 27 tends to increase above the speed for which governor 34 is set, socket member 35 will be caused to move toward the right of Figure 2. This in turn will cause bell crank lever 36, which is pivotally mounted on housing 11, to pivot in a counter-clockwise direction. Link 37, which has one end thereof pinned to bell crank lever 36 and the other end to bearing 23, will thus move downwardly. Since the speed adjuster mechanism is being rotated in a counter-clockwise direction, which as explained above, will cause a reduction of the speed of output shaft 27, the speeding up of shaft 27 is effectively counteracted. In an analogous manner if shaft 27 should tend to slow down because of a slowing down of driver shaft 10, the fly ball governor 34 will cause speed adjuster 17 to pivot in a clockwise direction and thus tend to increase the speed of shaft 27. Thus the speed of an output shaft may be maintained constant irrespective of variations in the speed of an input shaft. It is to be readily understood that any suitable type of speed governing device may be used, and that the modification of Figure 2 is not restricted to use with a conventional fly ball governor, as shown.

Reference is now made to Figure 3 wherein a simplified modification of the present invention is shown. A driver shaft 38 has affixed to the end thereof a dished driving wheel 39 having surface 40 which is adapted to contact variable radius member 41 of speed adjuster 42. Variable radius member 41 is mounted on one end of rotatable shaft 43 which in turn has variable radius member 44 mounted on the other end thereof. Variable radius member 44 is adapted to contact surface 45 of dished driven wheel 46 which is mounted on driven shaft 47.

The speed adjuster 42 is suitably mounted for rotation in housing 48, as by ball joint 49' which also provides pivotable movement of the speed adjuster in the plane of the drawing. The surface of variable radius member 41 is spherical, as is the surface 50 of variable radius member 44. The radii of surfaces 49 and 50 originate at the center of pivotal movement of shaft 43, and more specifically, the center of spherical ball 49'.

A control bellows 28' is pivoted at point 51 to housing 48. Bellows 28' is adapted to be connected to a source of varying fluid pressure by tube 52, as explained relative to Figure 1. The expansion and contraction of bellows 28' will cause movement of links 53 and 54, the latter being connected to bearing collar 55 which is mounted on shaft 43. It is to be noted that the bearing collar 55 may also serve the function of restricting pivotal movement of speed adjuster 42 to the plane of the drawing, or any other suitable structure may be used. Thus it can be seen that the expansion and contraction of bellows 28' will cause either clockwise or counter-clockwise pivotal movement of speed adjuster 42.

The device of Figure 3 operates in the following manner: In response to an expansion of bellows 28', shaft 43 will move in a counter-clockwise direction, thus decreasing the effective radius of variable radius member 41 relative to driver wheel 39. Thus counter-clockwise movement of speed adjuster 42 will cause the speed of rotation of shaft 43 to increase for any given speed of wheel 39. Since variable radius member 44 is also affixed to shaft 43 its speed of rotation will also increase. However, since the effective radius of member 44 is now increased relative to driven wheel 46 because of the pivotal movement of shaft 43, the net result is that driven shaft 47 will rotate at a higher speed. In an analogous manner the contraction of bellows 28' will cause a decrease in speed of shaft 47.

The advantages of the construction of Figure 3 are as follows: The expansible pulley and belt drives of Figure 1 have been eliminated, thus providing a simpler and less costly structure. Furthermore, since surfaces 49 and 50 are spherical there will always be the same contact pressure between these surfaces and surfaces 40 and 45, respectively, thus obviating the objectionable binding which is obtained when the expansible pulleys utilizing belt drives of Figure 1 are pivoted out of exact parallelism.

Reference is now made to Figure 4 for a still further modification of the present invention. The driving wheel 56 and the driven wheel 57 are of the same construction as wheels 39 and 46, respectively, of Figure 3. The bellows 28" and all of its associated linkage is likewise the same as bellows 28' of Figure 3. The major difference of Figure 4 over Figure 3 is in the construction of speed adjuster 58 in that it permits the input and output shafts to lie at an angle to each other rather than in parallelism. To this end spherical variable radius member 59 is affixed to shaft 60 which is in turn rotatably mounted on plate 61 by suitable brackets 62. One end of shaft 60 carries crown gear 63 which is adapted to mesh with crown gear 64, the latter being mounted on shaft 65 which in turn mounts spherical surface 66. Shaft 65 is rotatably mounted on plate 61 by suitable brackets 67. Plate 61 is pivotally mounted in bearing members 68. The radii of spherical surfaces 59 and 66 are taken from the center of pivotal movement of plate 61, so that regardless of the orientation of said plate there will always be an equal amount of frictional contact between members 56 and 59 and between members 66 and 57.

The modification of Figure 4 operates in the same manner as the modification of Figure 3, and possesses all of the advantages of the latter. One further advantage, as noted above, is that the driver shaft and the driven shaft do not have to be parallel but may be at any angle to each other.

Figure 5:
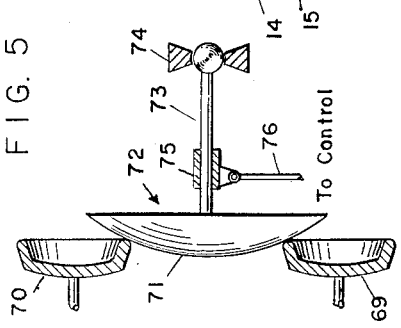
Figure 5 is a still further modification of the present invention.

A highly simplified version of my present invention is shown in Figure 5. Driver wheel 69 is similar in structure to driver wheel 39 of Figure 3. Driven wheel 70 is similar in structure to driven wheel 46 of Figure 3. Wheels 69 and 70 are mounted on shafts (not numbered) and are adapted to contact spherical variable radius member 71, as shown. Variable radius member 71 forms a part of speed adjuster 72, the remaining parts of the latter being a rotatable shaft 73 affixed at one end to variable radius member 71 and suitably mounted in housing 74 at its other end for both rotatable and pivotal movement. A bearing collar 75 leads to a control member (not shown) in the same manner discussed above relative to Figures 3 and 4. The structure for permitting both rotatable and pivotal movement of speed adjuster 72 is the same as described relative to Figure 3.

The modification of Figure 5 operates in the following manner: The control member will cause shaft 73 to pivot either clockwise or counter-clockwise in the plane of the drawing in response to a control impulse. It can readily be seen that as shaft 73 pivots clockwise, the effective radius of variable radius member 71 will increase relative to driver member 69. Simultaneously, the effective radius of variable radius member 71 will decrease relative to driven member 70. The net result of the foregoing is that driven member 70 will have its speed reduced relative to driver member 69 for any given speed of the latter. In an analogous manner a counter-clockwise movement of shaft 73 will cause the speed of driven member 70 to increase relative to driver member 69.

It can thus be seen that I have disclosed inexpensive, simple, and efficient driving arrangements which permit the control of the speed of an output member in response to the change in condition of a control member.

While I have described preferred embodiments of my invention, it will be understood that it is not limited thereto since it may be otherwise embodied within the scope of the following claims.

I claim:

1. A transmission for varying the speed of a driven member with respect to a driver member comprising a frame, a fulcrum on said frame, a speed adjuster assembly including first and second shafts pivotally mounted on said fulcrum, a first expansible pulley including two pulley halves mounted on said speed adjuster assembly on one side of said fulcrum, a second expansible pulley including two pulley halves mounted on said speed adjuster assembly on the other side of said fulcrum, said pulley halves adjacent said fulcrum being mounted on said first shaft, said pulley halves remote from said fulcrum being mounted on said second shaft, first and second flexible drive means coupling said driver and driven members with said first and second pulleys, respectively, and means for pivoting said first and second pulleys with relation to each other.

2. A transmission for varying the speed of a driven member with respect to a driver member comprising a frame, a fulcrum on said frame, a speed adjuster assembly including first and second shafts pivotally mounted on said fulcrum, a first expansible pulley, including two halves mounted on said speed adjuster assembly on one side of said fulcrum, a second expansible pulley, including two pulley halves mounted on said speed adjuster assembly on the other side of said fulcrum, said pulley halves adjacent said fulcrum being mounted on said first shaft, said pulley halves remote from said fulcrum being mounted on said second shaft, first and second flexible drive means coupling said driver and driven members with said first and second pulleys, respectively, and means for pivoting said speed adjuster assembly, said pivoting means comprising a speed governing device affixed to said driven member to pivot said speed adjuster assembly so as to cause said driven member to be driven at a constant speed irrespective of variations in the speed of the driver member.

3. A transmission for varying the speed of a driven member with respect to a driver member comprising a frame, a fulcrum on said frame, a speed adjuster assembly including first and second shafts pivotally mounted on said fulcrum, a first expansible pulley including two pulley halves mounted on said speed adjuster assembly on one side of said fulcrum, a second expansible pulley including two pulley halves mounted on said speed adjuster assembly on the other side of fulcrum, said pulley halves adjacent said fulcrum being mounted on said first shaft, said pulley halves remote from said fulcrum being mounted on said second shaft, first and second flexible drive means coupling said driver and driven members with said first and second pulley, respectively, and means for pivoting said speed adjuster assembly, said pivoting means comprising a control member which produces motion in response to the change in an external condition.

4. A transmission for varying the speed of a driven member with respect to a driver member comprising a frame, a fulcrum on said frame, a speed adjuster assembly including first and second shafts pivotally mounted on said fulcrum, a first expansible pulley including two pulley halves mounted on said speed adjuster assembly on one side of said fulcrum, a second expansible pulley including two pulley halves mounted on said speed adjuster assembly on the other side of said fulcrum, said pulley halves adjacent the fulcrum being mounted on said first shaft, said pulley halves remote from said fulcrum being mounted on said second shaft, first and second flexible drive means coupling said driver and driven members with said first and second pulleys, respectively, and means for pivoting said speed adjuster assembly, said first and second shafts being coaxial.

5. A transmission according to claim 4 wherein said remote pulley halves are fixedly mounted on said second shaft against axial movement relative to each other.

6. A transmission for varying the speed of a driven member with respect to a driver member comprising a frame, a speed adjuster assembly including first and second expansible pulleys pivotally mounted on said frame, a first belt drive member coupling said first pulley and said driver member, a second belt drive member coupling said second pulley and said driven member, means for pivoting said speed adjuster assembly about an axis extending in a substantially perpendicular direction to the axes of rotation of said pulleys, and means on said speed adjuster for varying the effective radius of said first pulley in one direction in response to the simultaneous varying of the effective radius of said second pulley in the other direction.

7. A transmission for varying the speed of a driven member with respect to a driver member comprising a frame, a speed adjuster assembly including first and second expansible pulleys pivotally mounted on said frame, a first flexible drive member coupling said first pulley and said driver member, a second flexible drive member coupling said second pulley and said driven member, means for pivoting said speed adjuster assembly about an axis extending in a substantially perpendicular direction to the axes of rotation of said pulleys and means in said speed adjuster for varying the effective radius of said first pulley in one direction in response to the simultaneous varying of the effective radius of said second pulley in the other direction, each of said expansible pulleys consisting of two pulley halves, said pivoting means comprising in part a fulcrum positioned between said first and second pulleys, and said speed adjuster assembly comprising a first shaft mounting the pulley halves of said first and second pulleys which are adjacent said fulcrum and a second shaft coaxial with said first shaft mounting the other of said pulley halves, at least one pair of said pulley halves being mounted on their shaft against relative axial movement with respect to each other.

8. A variable speed transmission comprising a frame, a rotatable speed adjuster mounted on said frame, said adjuster including a shaft, a variable radius member mounted on one end of said shaft, a pivotally mounted plate member connected with the opposite end of said shaft, a second shaft connected with the plate member, gear members connecting said shafts, and a second variable radius member mounted on the second shaft, a driver shaft carrying a dished driving wheel adapted to contact the first member, a driven shaft carrying a dished driven wheel adapted to contact the second member, and means responsive to an external condition for automatically pivoting said plate to vary the effective radii of the members relative to the driving wheel and the driven wheel.

References Cited in the file of this patent

UNITED STATES PATENTS

| 1,775,201 | Jacobsen | Sept. 9, 1930 |
| 2,235,122 | Shaw | Mar. 18, 1941 |
| 2,721,483 | Hacker | Oct. 25, 1955 |
| 2,784,604 | Kraus | Mar. 12, 1957 |

FOREIGN PATENTS

| 410,912 | Italy | June 15, 1945 |
| 698,446 | Great Britain | Oct. 14, 1953 |
| 1,077,232 | France | Apr. 28, 1954 |
| 1,115,344 | France | Apr. 23, 1956 |

UNITED STATES PATENT OFFICE
CERTIFICATE OF CORRECTION

Patent No. 2,911,838                                                      November 10, 1959

William L. McGrath

It is hereby certified that error appears in the printed specification of the above numbered patent requiring correction and that the said Letters Patent should read as corrected below.

Column 2, line 53, after "center" insert -- of --.

Signed and sealed this 22nd day of March 1960.

(SEAL)
Attest:

KARL H. AXLINE
Attesting Officer

ROBERT C. WATSON
Commissioner of Patents